United States Patent [19]

Hendy

[11] 4,002,812
[45] Jan. 11, 1977

[54] PRODUCTION OF UNIFORM COPOLYMER OF ACRYLONITRILE AND AROMATIC OLEFINES

[75] Inventor: Brian Norman Hendy, Welwyn, England

[73] Assignee: Imperial Chemical Industries Limited, London, England

[22] Filed: Dec. 13, 1974

[21] Appl. No.: 532,688

[30] Foreign Application Priority Data

Dec. 20, 1973 United Kingdom ............ 59053/73

[52] U.S. Cl. .................................. 526/59; 526/61; 526/87; 526/200; 526/342; 526/909; 526/910; 260/887; 260/888
[51] Int. Cl.² .................. C08F 2/20; C08F 212/10
[58] Field of Search ............ 260/17 A, 887, 85.5 R, 260/85.5 HC; 450/695; 526/61, 87, 200, 59

[56] References Cited

UNITED STATES PATENTS

| | | | |
|---|---|---|---|
| 3,284,542 | 11/1966 | Carrock et al. | 260/880 R |
| 3,480,602 | 11/1969 | Abercrombie et al. | 260/92.8 W |
| 3,560,418 | 2/1971 | Kelley et al. | 260/85.5 HC |
| 3,828,013 | 8/1974 | Nield | 260/85.5 R |

FOREIGN PATENTS OR APPLICATIONS

| | | |
|---|---|---|
| 1,197,721 | 7/1970 | United Kingdom |
| 1,327,095 | 8/1973 | United Kingdom |
| 1,185,306 | 3/1970 | United Kingdom |

*Primary Examiner*—Edward J. Smith
*Attorney, Agent, or Firm*—Cushman, Darby & Cushman

[57] ABSTRACT

Copolymers of acrylonitrile and conjugated aromatic olefines, such as styrene, containing 50–95% molar of acrylonitrile are made using an aqueous suspension process in which hydroxyethyl cellulose is used as the suspension agent.

4 Claims, No Drawings

PRODUCTION OF UNIFORM COPOLYMER OF ACRYLONITRILE AND AROMATIC OLEFINES

The present invention relates to a method for the production of copolymers of acrylonitrile and conjugated aromatic olefines and in particular to the production of copolymers containing a high proportion of acrylonitrile.

Owing to the great ease with which many conjugated aromatic olefines copolymerise in the presence of a high proportion of acrylonitrile, the proportion of copolymer formed at the beginning of the reaction tends to be enriched with the aromatic olefine at the expense of the portion of copolymer formed at the end of the reaction, and the latter tends therefore to have the disadvantageous properties of crystalline polyacrylonitrile unless precautions are taken to feed the monomers, or at least the aromatic olefine, into the reaction medium throughout the course of the polymerisation such that the concentration ratio between the monomers at the site of reaction is maintained substantially constant whereby a 'uniform copolymer' is formed; by a 'uniform copolymer' we mean a copolymer in which the polymer molecules formed early in the reaction have substantially the same average compositions as those formed subsequently.

A convenient method of doing this is described in our British Patent Specification No. 1 197 721 the disclosure of which is incorporated herein by reference. In this method, the heat of polymerisation during the reaction is measured by calorimetry and monomer added pro rata as heat is produced.

In principle, the total amount of heat produced per gram of polymer formed can be calculated from the heats of copolymerisation of the monomers or approximately from their known heats of homopolymerisation. Thus the maximum amount of heat for complete polymerisation can be foretold in any particular case. Likewise, the total amount of monomer to be added for a 100% yield of a copolymer of the desired composition can be calculated in advance, and hence also the amount of monomer to be added to correspond with a measured amount of heat. Any incidental losses or gains of heat from the system are estimated by calculation and/or by experiment and allowed for in the measured heat.

The composition of the copolymer produced depends very closely on the concentration of monomers in the polymerising mixture, and this is reflected in the amount of each monomer needed in the initial charge. Published data permit this to be calculated although in some cases empirical refinements may be required until the copolymers have optimum physical properties, demonstrated for example by giving good clear compression mouldings.

For example, to produce 100 g of a uniform copolymer of acrylonitrile and styrene, the amount of styrene to be mixed with the whole required amount of acrylonitrile in the initial charge has been calculated for copolymers of various styrene content, and the results (relating to polymerisations carried out in aqueous emulsion) are shown in the following table (the rest of the styrene being added continually during the polymerisation).

| Styrene in Initial Charge | Acrylonitrile | Styrene in Copolymer |
|---|---|---|
| 0.43 cm³ | 113.3 cm³ | 5% molar |
| 0.86 cm³ | 102.7 cm³ | 10% molar |
| 1.12 cm³ | 97.6 cm³ | 12.5% molar |
| 1.40 cm³ | 93.0 cm³ | 15% molar |
| 1.63 cm³ | 88.3 cm³ | 17.5% molar |
| 1.94 cm³ | 84.0 cm³ | 20% molar |
| 2.67 cm³ | 75.6 cm³ | 25% molar |

Another method for obtaining uniform copolymers by monomer feeding employs vapour phase chromatography to periodically analyse the composition of the reaction mixture whereby monomer may be added accordingly. This method is exemplified in U.S. Pat. No. 3 819 762 and in British Pat. No. 1 327 095.

While the copolymerisation method involving monomer feeding is general to any reaction medium, the examples of producing copolymers of acrylonitrile and aromatic olefines in the above-mentioned Patents were all carried out using an aqueous emulsion polymerisation process employing an emulsifying agent. In aqueous emulsion polymerisations, the initiator radicals are formed in the aqueous phase from a water-soluble initiator system and the particles of the resulting polymer are very small, usually less than one micron. Aqueous emulsion polymerisations may be contrasted with aqueous suspension polymerisation using a suspension agent in which the initiator is monomer-soluble and the particles of the resulting polymer are substantially greater than those produced by an emulsion polymerisation process. Examples of monomer-soluble initiators used in aqueous suspension polymerisations are acyl peroxides dialkylperoxydicarbonates and azo compounds having activating substituents such as nitrile groups.

The copolymerisation methods described in British Patent Nos. 1 197 721 and 1 327 095 may be applied to polymerisation in both emulsion and suspension. For commercial reasons, however, it is preferably to employ an aqueous suspension process since this is generally cheaper to operate than an emulsion process. For example, much less suspension agent is generally required for a suspension polymerisation compared with the amount of emulsifying agent required for an emulsion polymerisation.

We have found, however, that application of a monomer feeding technique such as those of British Patent Nos. 1 197 721 and 1 327 095 to a suspension process for the production of uniform copolymers of acrylonitrile and at least one conjugated aromatic olefine containing a high proportion of acrylonitrile can result in granulation problems because we have found that the use of many commercially available suspension agents results in the formation of polymer having an unacceptable particle size distribution, e.g., the particles being in the main much too large or even agglomerated.

According to the present invention there is provided method for the batchwise production of a uniform copolymer of acrylonitrile and at least one conjugated aromatic olefine having a faster reaction rate containing 50 to 95% molar of acrylonitrile units which method comprises polymerising the monomers in aqueous suspension and feeding a portion of at least the faster reacting aromatic olefine to the reaction mixture so as to produce said uniform copolymer wherein hydroxyethyl cellulose is employed as suspension agent.

A preferred embodiment of the invention comprises heat from the reaction vessel by heat exchanging with a fluid whereby the rate of production of heat in the copolymer formation may be determined and feeding at least a proportion of the faster reacting aromatic olefine to the reaction mixture at a rate dependent on the rate of production of heat in the copolymer formation so that the total amount of monomer fed to the reaction mixture up to any given time corresponds to the total integrated heat produced up to that time.

By the phrase "feeding a portion of at least the faster-reacting aromatic olefine" is meant that the monomer feed can consist solely of the olefine portion or can include some acrylonitrile (and/or other monomer if used) in addition to aromatic olefine.

It is found that the use of hydroxyethyl cellulose as suspension agent yields copolymers having an acceptable particle size distribution.

Hydroxyethyl cellulose is a hydroxyethyl ether of cellulose formed by the reaction between cellulose and ethylene oxide. A cellulose molecule comprises a chain of anhydroglucose units, each anhydroglucose unit containing three hydroxyl groups which can react with ethylene oxide whereby hydroxyethyl groups are introduced into the molecule. The average number of groups per anhydroglucose unit which are substituted is known as the "degree of substitution" (D.S.). If all three hydroxyl groups in every anhydroglucose unit were substituted, the hydroxyethyl cellulose would have a D.S. of 3.

The hydroxyethyl groups can be introduced into the cellulose molecule by reaction of ethylene oxide at the hydroxyl groups in the cellulose chain and also by reaction of ethylene oxide at a previously substituted hydroxyl group so as to form a polymeric side chain. The average number of moles of ethylene oxide incorporated into each anhydroglucose unit (in the two ways described above) is known as "moles of substituent combined" (M.S.).

It is preferred to use hydroxyethyl cellulose which has M.S. within the range 1.5 to 3.5, particularly 2 to 3.5 and D.S. within the range 1.0 to 3.0, particularly 1.5 to 3.0. It is preferred that the Brookfield Viscosity of the hydroxyethyl cellulose, measured on a 1% by weight aqueous solution at 25° C lies within the range 500 to 5000 cps, particularly 1000 to 3000 cps.

We have found a commercially available hydroxyethyl cellulose known as "Natrasol" 300 H convenient to use in the method of the invention. This material has, according to the manufacturers, Hercules Incorporated, D.S. 3.0 and a Brookfield Viscosity (measured on a 1% by weight aqueous solution at 25° C) of 1500 to 2500 cps.

The acrylonitrile copolymers made by the method of the invention preferably contain 66 to 95% molar of acrylonitrile units; those with greater than 95% molar acrylonitrile units may, under certain conditions, be difficult to fabricate without decomposition. Particularly preferred are copolymers containing 86 to 93% molar of acrylonitrile units since the use of this range results in an excellent combination of impact strength and impermeability.

The conjugated aromatic olefine used in the method of the invention is selected from those of the formula $CH_2:CR.Ar$ and also acenaphthylene, indene and coumarone. In this formula R is hydrogen or methyl and Ar is an optionally ring-substituted residue or aromatic character having not more than 3 rings and each substituent (if any) having not more than 4 carbon atoms. Examples of such olefines include styrene, α-methylstyrene, o-methylstyrene, m-methylstyrene, p-methylstyrene, m-vinylphenol, p-trimethylsilylstyrene, 2,5-dimethylstyrene, p-methoxystyrene, 1-vinylnaphthalene, p-dimethylaminostyrene, ar-dibromostyrene, 2-vinylthiophene, 3-vinylphenanthrene, N-vinylcarbazole, or a vinylpyridine (e.g. 2-methyl-5-vinylpyridine). Of these, styrene and α-methyl styrene, either alone or together are preferred.

In the method of the invention, the molecular weight of the copolymer may be controlled by employing chain transfer agents such as thiols e.g. lauryl mercaptan, butyl mercaptan, n-octyl mercaptan, limonene mercaptan, pentaerythritol tetra (3-thiopropionate), iso-octyl thioglycollate, and trimethylol propane tri(3-thiopropionate), and/or chain terminators such as terpenes e.g. terpinolene. Preferably a portion of the chain transfer agent is added to the initial reaction mixture, the remainder being added with the feed of the aromatic olefine. It may also be desirable towards the end of the polymerisation to add a material which retards or stops polymerisation, in order to curtail rapid increases in reaction rate due to effects like autoaccelerated polymerisation. Suitable materials include dipentene, dihydroanthracene and phenols such as p-methoxy phenol.

Since the polymerisation mostly takes place in the monomer phase (the initiator being monomer-soluble) it may be desirable to employ a salt to lessen the solubility of acrylonitrile in water. Suitable salts include aluminium sulphate, magnesium sulphate and sodium sulphate. A material such as sodium dimethyl dithiocarbonate may also be added to supress aqueous phase polymerisation.

The copolymers made by the method of the present invention may be modified by incorporating lubricants, plasticisers, stabilisers, optical brighteners and fillers such as colloidal rubber particles or glass fibres before fabrication into shaped articles.

The properties of the copolymers may also be modified by copolymerising one or more additional ethylenically unsaturated monomers with the acrylonitrile and aromatic olefine. These additional monomers will normally represent only a small percentage of the total polymer, i.e. less than 10% molar and usually less than 5% molar, and generally may be added in entirety to the initial charge. However where the reactivity of the added monomer is high compared with that of acrylonitrile (particularly when they are themselves conjugated aromatic olefines), or where relatively large quantities are involved, it may be preferable to add all or part of the modifying comonomers with the monomer feed. For instance the polymer may be made flame-retardant by using dibromostyrene as part or all the aromatic olefine; in this case the dibromostyrene would be added to the reaction vessel with the monomer feed. Improved dyeability may be imparted by adding as a comonomer a few per cent of vinyl pyridine. The processability may be improved by adding to the initial charge a few per cent of a long-chain alkyl vinyl ether, e.g. cetyl vinyl ether. The softening point may be increased by adding to the initial charge a few per cent of a copolymerisable cyclic compound such as a maleimide or norbornene derivative.

A major potential use for a copolymer made by the method of the invention is as the resinous superstrate of a graft copolymer having a rubber substrate. Another major potential use is as the resinous component (not containing rubber) of a blend with a compatible graft copolymer having a rubber substrate. Such a graft copolymer may be made using emulsion or suspension polymerisation. Preferably, however, the graft copolymer is made using emulsion polymerisation, and there is provided a blend comprising a uniform copolymer of acrylonitrile and at least one conjugated aromatic olefine prepared by an aqueous suspension polymerisation process as hereinbefore defined and a compatible graft copolymer having a diene rubber substrate prepared by an aqueous emulsion polymerisation process. Preferably, such a blend contains 1 to 50% by weight of the diene elastomer, particularly 1 to 25%. Suitable for such blends are grafts containing a polybutadiene substrate and a superstrate of acrylonitrile/isobutene copolymer (as described in British Patent Specification No. 1 143 408) or of uniform acrylonitrile/styrene copolymer having a high percentage of acrylonitrile (as described in British Patent Specification No. 1 185 305). A graft or blend as described is generally tougher than the untreated copolymer of the present invention, and tends to have, for example, a high impact strength. The elastomer in the graft or blend, however, does tend to marginally decrease the impermeability and rigidity of the composition. It is important when blending the present copolymers to use a graft which is compatible therewith if the required degree of toughness is to be obtained. Preferred graft copolymers for blending with the uniform copolymers of the present invention are those having a superstrate of approximately the same composition as the uniform copolymers.

The present invention is illustrated by the following Examples.

EXAMPLE 1

A uniform copolymer of acrylonitrile and styrene containing 12.5% molar of uniformly distributed styrene units and 87.5% molar of acrylonitrile units (as determined by infra-red analysis) was prepared using apparatus substantially as shown in FIG. 1 of our British Patent Specification No. 1 197 721.

The initial charge consisted of distilled water (1.5 l), acrylonitrile (703 ml), styrene (8.06 ml), lauryl mercaptan (12 ml) as chain-transfer agent, sodium sulphate (14.4 g) acting to lower the water-solubility of the acrylonitrile, and hydroxyethyl cellulose (1.44 g. "Natrasol" 300 H) as suspension agent. Air was removed from the reaction vessel and replaced by nitrogen. The reaction mixture was heated to 60° C and vigorously agitated (stirrer speed not recorded).

Polymerisation was initiated by the addition of 2,2'-azo-bis(2,4-dimethylvaleronitrile) (4.5 ml of a 20% by weight solution in dichloroethane) and a feed consisting of an air-free mixture of styrene (165.6 ml) and lauryl mercaptan (3.0 ml) was added in a linear manner to the initial charge at the rate of the polymerisation so that if the polymerisation had been allowed to proceed to completion (corresponding to the polymerisation of all the acrylonitrile) all the sytrene (165.6 ml) would have been added. After about 4.1 hours when 61% of the feed had been added (i.e. 61% conversion), the reaction had slowed down considerably and feeding was discontinued.

The batch was stripped and the resulting copolymer was filtered, washed with distilled water in the filter and then dried in a vacuum oven at about 80° C. Very little build-up was observed in the reaction vessel. The copolymer consisted mainly of freely flowing spherical translucent particles having a size distribution within the range 15–120 microns.

EXAMPLE 2

A uniform copolymer of acrylonitrile and styrene containing 13.7% molar of uniformly distributed styrene units and 86.3% molar of acrylonitrile units (as determined by infra-red analysis) was made on a larger scale than the copolymer of Example 1 using a conventional steel autoclave jacketted to take cooling water and fitted with an anchor stirrer.

The initial charge consisted of distilled water (12.0 litres), acrylonitrile (5625 ml), styrene (65 ml), lauryl mercaptan (64 ml) as chain-transfer agent, sodium sulphate (115.2 g) acting to lower the water-solubility of the acrylonitrile, a buffering system of potassium dihydrogen phosphate (161.68 g) and disodium hydrogen phosphate (11.12 g) to keep the pH at about 5.6 and hydroxyethyl cellulose (11.52 g, "Natrasol" 300 H) as suspension agent. Air was removed from the autoclave and replaced by nitrogen. The reaction mixture was heated to 60° C and agitated with the stirrer turning at 260 r.p.m.

Polymerisation was initiated by the addition of 2,2'-azo-bis(2,4-dimethylvaleronitrile) (100 ml of a 20% by weight solution in dichloroethane) and a feed consisting of an air-free mixture of styrene (1325 ml) and lauryl mercaptan (24 ml) was added in a linear manner to the initial charge at the rate of the polymerisation such that if the polymerisation had been allowed to proceed to completion (corresponding to the polymerisation of all of the acrylonitrile) all of the styrene (1325 ml) would have been added. The rate of addition of the feed was determined according to the heat output of the reaction as determined by the rise in temperature and flow rate of the circulating water in the jacket which kept the autoclave contents at about 60° C. The heat liberated and the instantaneous amount of styrene to be added to the reaction mixture were computed electronically from the flow rate and temperature difference (taking account of any extraneous heat loss/-gains or other corrections resulting e.g. from changes in the batch or jacket temperatures). After about 3.3 hours when 79% of the feed had been added, the reaction has slowed down considerably and the autoclave was vented.

The batch was stripped, and the resulting copolymer was filtered, washed with distilled water in the filter and then dried in a vacuum oven at about 80° C. Very little build-up was observed in the autoclave. The copolymer consisted mainly of freely flowing spherical clear particles having a size distribution within the range 15 to 120 microns.

EXAMPLE 3

The procedure of Example 2 was repeated except that a mixture of lauryl mercaptan (32 ml) and butyl mercaptan (32 ml) replaced the sole use of lauryl mercaptan as chain transfer agent in the initial charge while butyl mercaptan (16 ml) replaced the lauryl mercaptan in the feed. After 4.25 hours, corresponding to about 82% conversion of the feed, the reaction was terminated by the addition of 5 ml of terpinolene. The resulting copolymer was isolated as described in Example 2 and had similar granular properties. Infra-red analysis indicated the copolymer contained 14.4% molar of styrene units and 85.6% molar of acrylonitrile units.

The polymerisations described in the preceding Examples were repeated many times, often with changes of recipe being employed such as variation of pH, amount of suspension agent, chain transfer agent and amount, initiator, scale, agitation conditions, monomer/water ratio. Similarly acceptable products were obtained.

cases. When necessary a moderator and/or short-stop agent was added to control or terminate the reaction. It will be noted from Table 1 that two of the runs were terminated at very low conversion. This was due to the sponge-like product severely impairing the motion of the stirrer, necessitating prompt termination of the reaction.

TABLE 1

| Ex. No. | Suspension Agent | Wt. used (g) (added as an aqueous solution) | Approximate Conversion | Description of Polymer |
|---|---|---|---|---|
| 4 | Gantrez AM 169 (methyl vinyl ether/ maleic anhydride copolymer) | 1.44 | 33% | Soft spongy mass |
| 5 | Versical E 15 (acrylic acid polymer) | 1.44 | 38% | Dough-like mass |
| 6 | Versical W 25 (acrylic acid polymer) | 1.44 | 66% | Spherical particles 15–1000$\mu$ (average 370 $\mu$) |
| 7 | Polyox WSR 301 (polyethylene oxide) | 1.44 | 75% | Large aggomerated particles 970–2235$\mu$ (average 1340 $\mu$) |
| 8 | Alcotex Spec. 'A' (partially hydrolysed polyvinyl acetate) | 2.16 | 60% | Large granules 2400–4300 $\mu$ (average 3000 $\mu$) |
| 9 | Poval 124 (polyvinyl alcohol) | 1.44 | 56% | Solid mass |

Most of the above runs were repeated (some several times) usually with recipe changes being employed such as variation of pH, amount of suspension agent, chain transfer agent and amount, and agitation conditions. Unacceptable products were nevertheless still obtained.

The following Examples demonstrate that other known suspension agents fail to provide acceptable granulation when used in the polymerisation system of the present invention.

EXAMPLES 4 to 9

The polymerisation recipe employed was substantially the same as that for Example 1, the same ingredients and substantially the same amounts being employed (although in Example 7, the lauryl mercaptan was replaced by pentaerythritol tetra (3-thiopropionate) as chain transfer agent) except for the suspension agent. This was varied in a series of experiments as shown in Table 1. The reaction temperature of each run was again about 60° C, with a temperature rise occurring towards the end of the reaction in most

EXAMPLES 10 to 18

The polymerisation recipe employed was substantially the same as that for Examples 4 to 9. However, the initiator employed was acetyl cyclohexane sulphonyl peroxide (used as a 30% solution in dimethyl phthalate, an amount being added sufficient to start the reaction, usually 0.5 to 2.5 ml, followed by subsequent addition as necessary to maintain the reaction) instead of 2,2'-azo-bis(2,4-dimethylvaleronitrile), the chain transfer agent was n-octyl mercaptan (3.0 ml in the initial charge and 3.0 in the feed) and not lauryl mercaptan, and amount of sodium sulphate was 75 g (though none was used in Examples 8 and 11). The suspension agent was again varied as shown in Table 2.

TABLE 2

| Ex. No. | Suspension Agent | Wt. used (g) (added as an aqueous solution or suspension) | Approximate Conversion | Description of Polymer |
|---|---|---|---|---|
| 10 | Alcotex Spec. 'C' (partially hydrolysed polyvinyl acetate) | 3.6 | 64% | Very large particles |
| 11 | Sodium polymethyl methacrylate | 3.6 | 81% | Mixture of very small particles (about 2$\mu$) and very large particles (up to 3000 $\mu$) |
| 12 | $Ca_3(PO_4)_2$ | 7.2 | 30% | Viscous dough-like mass solid lump round stirrer |
| 13 | Cellofas B50 (sodium carboxymethyl cellulose | 1.44 | 46% | Viscous dough-like mass which caused stirrer to snap in two |
| 14 | Bentonite clay | 2.2 | 23% | Viscous dough-like mass |
| 15 | Dasol 'A' (water sol. anionic polymeric dialdehyde) | 3.6 | 43% | Dough-like mass |
| 16 | DX 840–61 (ethylene/maleic anhydride copolymer) | 3.6 | 34% | Dough-like mass |
| 17 | Vicofas 'X' 100,000 (methyl vinyl ether/ maleic anhydride copolymer) | 3.6 | 31% | Dough-like mass |
| 18 | Polyox WSR 205 | 3.0 | 43% | Larger rubbery granules |

TABLE 2-continued

| Ex. No. | Suspension Agent | Wt. used (g) (added as an aqueous solution or suspension) | Approximate Conversion | Description of Polymer |
|---|---|---|---|---|
| | (polyethylene oxide) | | | |

As with Examples 4 to 9, the granulometry of the products was quite unacceptable.

I claim:

1. A suspension polymerization process for the batchwise production of a uniform copolymer of acrylonitrile and at least one conjugated aromatic olefine having a faster reaction rate selected from the group consisting of styrene and α-methyl styrene, said copolymer containing 50 to 95% molar of acrylonitrile units, which method comprises polymerising the monomers in aqueous suspension and feeding a portion of at least the faster-reacting aromatic olefine to the reaction mixture so as to produce said uniform copolymer wherein the suspension agent employed is hydroxyethyl cellulose which has M.S. of 1.5 to 3.5, D.S. of 1.0 to 3.0, and Brookfield viscosity (measured on a 1% by weight aqueous solution at 25° C) of 500 to 5000 cps and wherein M.S. is the average number of moles of ethylene oxide incorporated into each anhydroglucose unit and D.S. is the average number of groups per anhydroglucose unit which are substituted.

2. A method according to claim 1 which comprises removing heat from the reaction vessel by heat exchanging with a fluid whereby the rate of production of heat in the copolymer formation may be determined and feeding at least a proportion of the faster reacting aromatic olefine to the reaction mixture at a rate dependent on the rate of production of heat in the copolymer formation so that the total amount of monomer fed to the reaction mixture up to any given time corresponds to the total integrated heat produced up to that time.

3. A method according to claim 1 wherein the quantities of comonomers employed are selected to provide a copolymer having 86 to 93% molar acrylonitrile units.

4. A method according to claim 1 employing a chain-transfer agent selected from lauryl mercaptan, butyl mercaptan, n-octyl mercaptan, liminone mercaptan, pentaerythritol tetra (3-thiopropionate), iso-octyl thioglycollate, and trimethylol propane tri(3-thiopropionate).

* * * * *